United States Patent [19]

Bedecarrax et al.

[11] Patent Number: 5,237,503
[45] Date of Patent: Aug. 17, 1993

[54] METHOD AND SYSTEM FOR AUTOMATICALLY DISAMBIGUATING THE SYNONYMIC LINKS IN A DICTIONARY FOR A NATURAL LANGUAGE PROCESSING SYSTEM

[75] Inventors: Chantal Bedecarrax, Clichy; Pierre Parisot; Isabelle Warnesson, both of Paris, all of France

[73] Assignee: International Business Machines Corporation, Armonk, N.Y.

[21] Appl. No.: 783,286

[22] Filed: Oct. 28, 1991

[30] Foreign Application Priority Data

Jan. 8, 1991 [EP] European Pat. Off. ............ 91480001

[51] Int. Cl.$^5$ .............................................. G06F 15/21
[52] U.S. Cl. ................................................ 364/419.08
[58] Field of Search ............................................ 364/419

[56] References Cited

U.S. PATENT DOCUMENTS

5,056,021 10/1991 Ausbohn ............................. 364/419
5,060,155 10/1991 Van Zuijlen ....................... 364/419

FOREIGN PATENT DOCUMENTS

0054667 12/1980 European Pat. Off. .
0067057 12/1982 European Pat. Off. .
0271664 6/1988 European Pat. Off. .

OTHER PUBLICATIONS

Second Conference on Applied Natural Language, Feb. 1988, Austin, TX, USA. pp. 144–151.
A Tool for Investigating the Synonymy Relations in a Sense Disambiguated Thesaurus "Un Dictionnaire Informatique des Synonymes", published in "Pour La Science" France, Feb., 1990, pp. 28–29.
"Database Machines and Database Management" by E. Ozkarahan, 1986, Prentice Hall, Englewood Cliffs, US, 1986, pp. 498–522.
Proceedings of the 4th Congress of "Reconnaissance des Formes et Intelligence Artificielle", vol. 2, Jan. 27, 1984, Paris, FR pp. 161–178.
Research Report RC14962, IBM Research Division, Yorktown Heights, NY, Sep. 22, 1989, pp. 1–24.

*Primary Examiner*—Roy N. Envall, Jr.
*Assistant Examiner*—Xuong Chung
*Attorney, Agent, or Firm*—Joseph C. Redmond, Jr.

[57] ABSTRACT

A method and system for automatically disambiguating the synonymic links in a dictionary for a natural language processing system. Said dictionary is stored in the memory of a data processing system and includes a list of headwords with their respective synonym lists. The same headword can have different meanings, each of which has its own synonym list, each of which also can have different meanings. Disambiguation of the synonymic links is performed by reading from said dictionary a "meaning-entry", the words from which it is a synonym and its own list of synonyms, to build a synonymic environment table. A similarity index is computed for each pair of words of said environment and the words having the greatest similarity with the aggregate are incrementally clustered. The final cluster is then validated and the "meaning-entry" and its disambiguated synonyms are written back into the dictionary.

9 Claims, 4 Drawing Sheets m : b,a,c
c : w,x,y,z

METHOD AND SYSTEM FOR AUTOMATICALLY DISAMBIGUATING THE SYNONYMIC LINKS IN A DICTIONARY FOR A NATURAL LANGUAGE PROCESSING SYSTEM

BACKGROUND OF THE INVENTION (a) Field of Invention

This invention relates to data processing methods and systems, and more particularly to the structure of a dictionary stored in the memory of a natural language processing (NLP) system.

(b) Prior Art

Until recently, research in computational linguistics has mostly focused on syntactic parsing. As a result of this effort, the syntactic capability of natural language processing (NLP) systems has reached a level of relative maturity and stability, enabling researchers to turn to other linguistic areas, such as semantics. Some systems that are dedicated to syntactic parsing tend to operate with small dictionaries, usually manually coded. Others are restricted to narrow semantic domains, where vocabulary is limited and lexical items mostly unambiguous. Most systems that are based on large vocabulary restrict the content of their dictionaries to syntactic information with minimal semantic information. It has recently become clear, however, that if machines are to "understand" natural language, they must resort to extensive lexical databases, in which a wealth of information about the meaning of words and their semantic relations is stored.

SUMMARY OF INVENTION

Normally, dictionaries contain information which is entered manually. This is a time consuming and labor intensive task. Moreover, this leads to inconsistencies which, while not detrimental where humans are involved, may lead to errors in the case of a NLP system.

One of the structural inconsistencies of certain dictionaries, is the non-systematization of symmetry in that, for example, the work "village" has "commune" in its synonym list, but the word "commune" does not have "village" in its synonym lists.

In a dictionary, word "a" is linked to word "b" if "a" is a headword and "b" appears in "a"'s synonym lists. Such relationships can be characterized according to their degree of symmetry and transitivity. The link between "a" and "b" is said to be symmetric if "a" points to "b" and "b" points to "a"; that is, if the headword "a" has "b" in its synonym list and the headword "b" has "a" in its list. The link between "a" and "b" is said to be transitive if, for every word "c", if "b" points to "c", then "a" points to "c" too; that is, if all the synonyms found in "a"'s synonym list are also found in "b"'s lists.

Since synonymic links occur between the senses of words but not between the words themselves, it appears necessary to disambiguate the words contained in the synonym lists.

Accordingly, the principal aim of disambiguation is to identify the relations between a dictionary entry and each of the words in the corresponding synonym list.

The same graphic form can cover different meanings; this is what linguists call polysemy and homonymy. The french adverb simplement (simply), for example, means both sans facon (unaffectedly) and seulement (merely), according to the context. Thus, one is obliged to consider two different entries simplement-1 (simply): sans facon (unaffectedly), . . . and simplement-2 (simply): seulement (merely), . . . . Therefore, the initial entries become "meaning-entries", every one of which uses its own list of synonyms. Considering the dictionary as a whole, we find the total number of synonymic links is very large and that, at this stage, they are still ambiguous. Even if we know that simplement-2 (simply) is synonymous with seulement, we still do not known with which "meaning-entry" it is associated because seulement is itself a polysemic entry. The problem to be addressed then, is to remove these ambiguities. The disambiguation process aims to automatically index the synonymic links between the "meaning-entries". The general purpose of the disambiguating systems is to quantify a priori qualitative relationships. The synonymic data are in essence qualitative if considered as lists of synonyms which are, in fact, descriptive attributes. Intuitively, it seems clear that the resolution of such a problem involves comparing these lists and measuring their similarities.

Let us consider two words "m" and "b" (assumed to be monosemous and polysemous, respectively), both of which are entries of an imaginary dictionary, and their synonyms:

m1: a, b, c, d.
b1: m, a, c.
b2: e, f, g.

This may take the form of:

| m | a | b | c | d |   |   |   |
|---|---|---|---|---|---|---|---|
| m | a | b | c |   |   |   |   |
|   |   |   | b |   | e | f | g |

Which can be represented as a matrix:

|    | m | a | b | c | d | e | f | g |
|----|---|---|---|---|---|---|---|---|
| m1 | 1 | 1 | 1 | 1 | 1 | 0 | 0 | 0 |
| b1 | 1 | 1 | 1 | 1 | 0 | 0 | 0 | 0 |
| b2 | 0 | 0 | 1 | 0 | 0 | 1 | 1 | 1 |

What were previously lists in the dictionary now become profiles within the matrix. The similarity measurements will be performed on the word profiles. The comparisons of the paired profiles lead to three types of configurations:

1. the 1 1 configurations: words belonging to both profiles
2. the 1 0 and 0 1 configurations: words belonging to either profile
3. the 0 0 configurations: words belonging to neither profile.

Similarity indexes quantify the resemblance between two words (between their synonym lists, their profiles, etc.) according to the observed configurations. There is a large choice of indexes, each one weighting to a more or less significant degree the different configurations. For example, the index can assign:

1. a positive role to the 1 1 configurations
2. a negative role to the 1 0 and 0 1 configurations
3. a neutral role to the 0 0 configurations.

The status of the 1 1, 1 0 and 0 1 configurations is obvious; the neutral role assigned to the 0 0 configurations needs t be clarified. If two words do not have a given word in their lists, this induces neither a resemblance nor a dissimilarity between them. If "sauerkraut" and "banana" are not synonymous with "home", this does not prove that they are similar. The absence of link is deliberate here. If "vachement (damned)" and "enormement (tremendously)" are not synonymous with "drôlement (terribly)", this does not prove that they are different either. In this case, the lack of synonymic link is not deliberate; in fact, it is impossible to treat the whole dictionary manually in a consistent way.

Similarity indexes seem to be the appropriate tools to measure the resemblance between words. However, they have to be integrated into a process that makes the most of the information they provide. These indexes work in such a way that it seems natural to use them simply as list matching tools, i.e. as a technique to compare any two word profiles. But this rough approach has some drawbacks when it is used for disambiguating highly complex relations or highlighting structural problems in the data. Depending on the a priori choice of a threshold, this approach often stumbles upon the two main pitfalls of the disambiguation process, namely:

1. Spurious indexing

Let us briefly present two examples of such configurations: Let us examine the similarities between the word "m" and two of its synonyms "a" and "b";

m1: a, b, c, d, e.
a1: m, e.
b1: m, c, d.

|    | m | a | b | c | d | e |
|----|---|---|---|---|---|---|
| m1 | 1 | 1 | 1 | 1 | 1 | 1 |
| a1 | 1 | 1 | 0 | 0 | 0 | 1 |
| b1 | 1 | 0 | 1 | 1 | 1 | 0 |

When the profiles are compared, it seems that the word "m" is strongly linked with both "a" and "b". FIG. 1 illustrates the relations between these words.

Actually, it appears that the words "a" and "b" are not similar at all. Each of them is relates to the different meanings of "m". This paradoxical situation is very frequent with such data. Merely matching lists would lead to the validation of spurious indexing.

2. Impossibility to index

Let us consider the network of relations illustrated in FIG. 2.

m: b, a, c
c: w, x, y, z

When the profiles of "m" and "c" are compared, it can be observed that only a very slight similarity exists between "m" and "c". Nevertheless, they are strongly linked through a synonymic network which is not obvious when comparisons are made merely using list matching techniques.

The latter only provides superficial information about a first level of relationship between words. But very often, the analysis of a second level of synonymic relationship reveals more precisely the meaning of the words being studied because it involve intermediary words.

To take such phenomena into account, a disambiguation method has been set up, which integrates a synonymic environment that is broader than the first level of relationship between synonyms.

It is, therefore, an object of this invention to provide an improved method and system for disambiguating the synonymic links in the dictionary of a natural language processing system.

It is another object of the invention to provide an improved method and system for disambiguating the synonymic links in the dictionary of a natural language processing system which provides information about a level of synonymic relationship broader than the first level.

It is still another object of the invention to provide an improved method and system for disambiguating the synonymic links in the dictionary of a natural language processing system which is ore accurate· and reliable than has been available in the prior art.

These and other aspects, features and advantages of the invention are accomplished by the disambiguating method and system disclosed herein.

A method is disclosed for automatically disambiguating the synonymic links in a dictionary for a natural language processing system, wherein said dictionary is stored in the memory of a data processing system and includes a list of "meaning-entries" with their respective synonym lists, characterized in that it comprises the following steps:

reading from said dictionary a "meaning-entry", the words from which it is a synonym and its own synonyms to build a synonymic environment table;

digitizing said environment table to build an environment matrix;

building a similarity matrix based on the computation of similarity indexes between the elements of said environment matrix;

incrementally clustering the words having the greatest similarity, first with said "meaning-entry" and later with the previous clusters; and writing the "meaning-entry" and the disambiguated synonyms back into said dictionary.

DESCRIPTION OF THE DRAWINGS

The invention will now be described with reference to the accompanying figures.

DESCRIPTION OF PREFERRED EMBODIMENT

Figure 1:
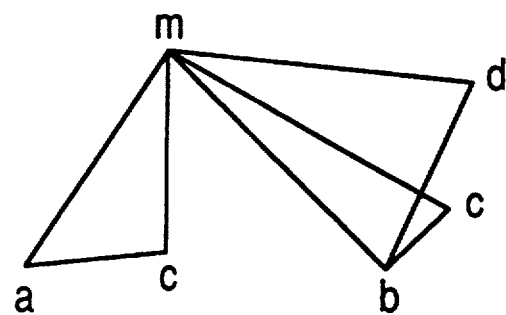
FIG. 1 is a diagram which represents the relation between an entry word and two of its synonyms, as described in the introduction of the description.
Figure 2:
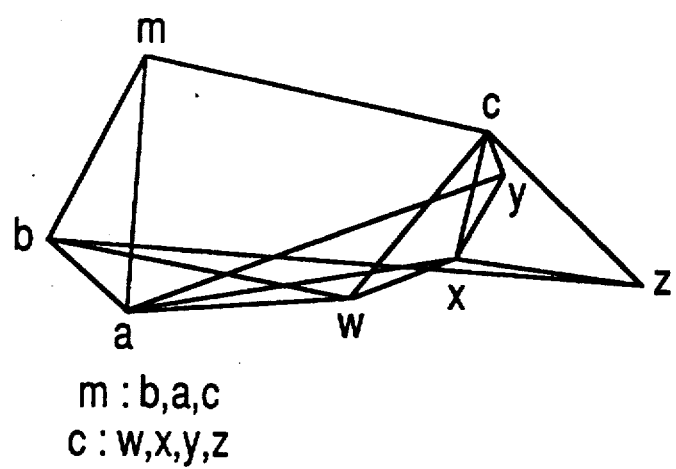
FIG. 2 is a diagram which represents the relation between an entry word and one of its synonyms, where a synonymic network exists, as described in the introduction of the description.
Figure 3:
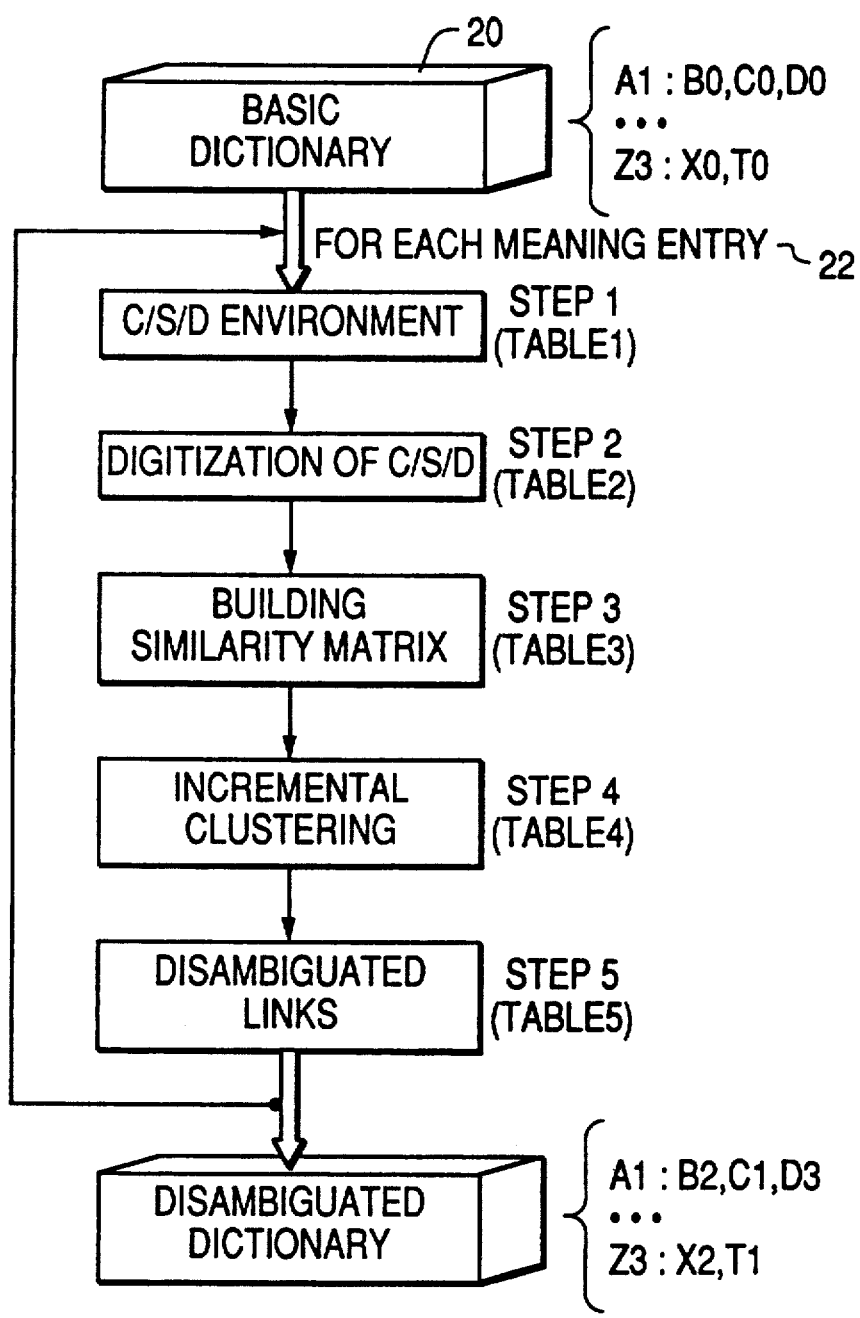
FIG. 3 is a flow chart illustrating the disambiguation method of the present invention.

Referring to FIG. 3, a dictionary 20 of synonyms is stored in a relational data base maintained on a Direct Access Storage Device (DASD) and managed by a relational data base management system, e.g. IBM Structured Query Language/Data System (SQL/DS), both of which are not shown.

SQL/DS uses the relational model of data. A "relation" in the relational data model can be thought of as a simple two-dimensional table having a specific number of columns and some number of unordered rows. Each row represents an entry in the relation (in the table). Data is defined and accessed in terms of tables and operations on tables. A single high level data access language is used for programming in a high level language or in interactive, on line query access. SQL/DS is more precisely described in SQL/Data System: Concepts and Facilities for VSE (IBM Reference: GH24-5013-3, Nov. 1984).

As shown in FIG. 3, according to the method of the invention, for each "meaning-entry" 22 in the basic dictionary 20 the related environment is retrieved: upstream the words of which it is a synonym, referred to as "call words", and downstream its own synonyms (step 1).

Table 1 shows the meaning entry "incroyablement 01" (incredibly) with its synonyms and "call words".

TABLE 1

| | |
|---|---|
| Incroyablement01: | drôlement00, enormement00, excessivement00, extrêmement00, extraordinairement00, fabuleusement00, formidablement00, terriblement00, tres00. |
| drôlement01: | comiquement00, cocassement00, risiblement00. |
| drôlement02: | bizarrement00, curieusement00, etrangement00. |
| effroyablement01: | terriblement00, horriblement00, abominablement00, affreusement00, atrocement00, epouvantablement00. |
| effroyablement02: | incroyablement00, invraisemblablement00. |
| enormement01: | tres00, beaucoup00. |
| epatamment01: | extraordinairement00, fabuleusement00, admirablement00, merveilleusement00, prodigieusement00, incroyablement00, fantastiquement00, chouettement00, remarquablement00. |
| excessivement01: | monstrueusement00, affreusement00, atrocement00, effroyablement00. |
| excessivement02: | extremement00, extraordinairement00, fabuleusement00, terriblement00, prodigieusement00, follement00. |
| excessivement03: | enormement00, fort00, outre mesure00, par trop00, exagerement00, demesurement00. |
| extraordinairement01: | excessivement00, extremement00, fabuleusement00, formidablement00, terriblement00, incroyablement00, fantastiquement00, exceptionnellement00, majestueusement00, monstrueusement00, horriblement00. |
| extremement01: | excessivement00, extraordinairement00, fabuleusement00, formidablement00, terriblement00, tres00, prodigieusement00, exceptionnellement00, horriblement00, fort00, infiniment00, puissamment00, tout @ fait00, immensement00. |
| fabuleusement01: | extremement00, extraordinairement00, prodigieusement00. |
| formidablement02: | extraordinairement00, fabuleusement00, prodigieusement00, diablement00, serieusement00, bigrement00. |
| horriblement01: | abominablement00, affreusement00, atrocement00, epouvantablement00, odieusement00, effroyablement00. |
| horriblement02: | excessivement00, extremement00, extraordinairement00, formidablement00, terriblement00, tres00, incroyablement00, diablement00, serieusement00, bigrement00. |
| monstrueusement01: | horriblement00, abominablement00, affreusement00. |
| monstrueusement02: | extraordinairement00, incroyablement00, inimaginablement00, invraisemblablement00. |
| monstrueusement03: | excessivement00, extremement00, prodigieusement00. |
| terriblement01: | drôlement00, excessivement00, extremement00, extraordinairement00, formidablement00, tres00, enormement00, |

TABLE 1-continued

| | |
|---|---|
| | diablement00, etrangement00, beaucoup00, vachement00. |
| tres01: | drôlement00, excessivement00, extremement00, terriblement00, enormement00, merveilleusement00, diablement00, bigrement00, follement00, infiniment00, tout @ fait00, vachement00, absolument00, parfaitement00, rudement00, tout plein00, vraiment00, hautement00, furieusement00, fortement00, en diable00, joliment00. |

To clarify the proposed example, the entries which are synonyms (S) of "incroyablement 01" are printed in bold type (drôlement, enormement, . . . ); the entries which are both synonyms of "incroyablement 01" and "call words" (D) for "incroyablement" (extraordinairement) are printed in bold italics; and the entries which are only "call words" (C) for "incroyablement" (effroyablement, epatamment, . . . ) are printed in italics. This set of 13 words divided in 21 meanings, make up the call words, synonyms and double status words (C/S/D) environment of the work "incroyablement 01", the pivot word to be disambiguated.

The disambiguation problem consists in labeling the 9 synonyms of that entry, i.e. replacing the suffixes to the same words when taken as entries.

All the data of the dictionary are stored on a disk and are organized as a two-dimensional table SYN TABLE.

SYN TABLE

| EW | ESN | SW | SSN |
|---|---|---|---|
| incroyablement | 01 | drôlement | 00 |
| incroyablement | 01 | excessivement | 00 |
| " | " | " | " |
| " | " | " | " |
| drôlement | 01 | comiquement | 00 |
| drôlement | 02 | bizarrement | 00 |
| " | " | " | " |
| " | " | " | " |
| enormement | 01 | beaucoup | 00 |
| " | " | " | " |
| " | " | " | " |
| effroyablement | 02 | incroyablement | 00 |
| " | " | " | " |
| " | " | " | " | where
EW = ENTRY-WORD
ESN = ENTRY SENSE NUMBER
SW = SYNONYM-WORD
SSN = SYNONYM SENSE NUMBER Disambiguating a synonymic link in the above table, consists in replacing the "00" of column (SSN) by the adequate sense number, For each "meaning entry", for example, "incroyablement-01", the relevant data from said SYN table are stored in the system memory by SQL commands, i.e.:

to retrieve all the synonyms of "incroyablement-01":
   "Select Synonym_word from SYN where Entry_word = 'incroyablement' and Entry_sense_number = 01"

similarly, to retrieve the "call words" of "incroyablement":
   "Select Entry_word, Entry_sense_number from SYN where Synonym_word = 'incroyablement'"

So, by just a few SQL queries, the necessary and sufficient links are stored in the system memory to set up the environment table of meaning-entry 'incroyablement 01'.

The presence of synonymic paradigms (sets of different meanings of a given word) is justified because it is precisely the object of the disambiguation process to select the "right" meaning from those proposed. The presence of "call words" paradigms is justified because it is frequent to observe an imbalance between the levels of polysemy of words belonging to the same paradigm. For instance, in the above list, it can be seen that, of the three meanings of "monstrueusement", it is the second one which has the pivot word as its synonym, whereas it is obviously the third meaning which offers the greatest similarity with the pivot word.

For each word, the corresponding C/S/D environment is retrieved from the dictionary. The data are then transformed into a matrix by associating the pivot word and the entries in its C/S/D environment with the set of words contained in the synonym lists for all of these words and assigning a value 1, when a synonymic relationship exists and a value 0 when it does not exist (step 2).

This transformation is illustrated by the following listing:

```
-----------------------------------------------------------------
Pseudo-code to build the environment matrix of a given word
sense (word W with sense_number S)
-----------------------------------------------------------------
MAIN:
nb_lines    = 0       /* 0 lines in the matrix                  */
nb_columns  = 0       /* 0 columns in the matrix                */
matrix(*,*) = 0       /* the matrix is empty                    */
word_line(*)   = '    /* identifiers of lines set to blank      */
word_column(*) = ''   /* identifiers of columns set to blank    */
index_line(*)  = 0    /* location of words in lines set to 0    */
index_column(*) = 0   /* location of words in columns set to 0  */
/*********************************************/
/* Ask the synonyms of the word W sense S,   */
/* fill in the first line of the matrix,     */
/* and add synonym-lines to the matrix       */
/*********************************************/
nb_lines = 1 word_line(1) = concatenate(W,S)
Select SYNONYM from SYN_TABLE where ENTRY = W and SENSE = S Do
while (next_answer exists)
    SQL_Get x_word
    xcol = LOCATE_COLUMN(x_word)   /* procedure to find the right
      column */
    matrix(1,xcol) = 1
    Select NUMBER_OF_SENSES from WORD_TABLE where WORD = x_word
    SQL_Get nb_senses
    Do i = 1 to nb_senses
        nb_lines = nb_lines + 1
        x_word_sense = concatenate(x_word,i)
        word_line(nb_lines) = x_word_sense
        index_line(x_word_sense) = nb_lines
    end
end /*********************************************/ /* Ask the callers
of the word W           */ /* and add synonyms-lines to the
matrix   */ /*********************************************/
```

```
Select ENTRY from SYN_TABLE where SYNONYM = W
Do while (next_answer exists)
   SQL_Get x_word
   xline = LOCATE_LINE(x_word)
        /* procedure to find the right line */
   if (xline<0) then do         /* if this line is new */
      Select NUMBER_OF_SENSES from WORD_TABLE
          where WORD = x_word
      SQL_Get nb_senses
      Do i = 1 to nb_senses
         nb_lines = nb_lines + 1
         x_word_sense = concatenate(x_word,i)
         word_line(nb_lines) = x_word_sense
         index_line(x_word_sense) = nb_lines
      end
   end
end /*********************************************/
/* Add columns to the matrix                 */
/* and fill in the whole matrix              */
/*********************************************/

Do i = 2 to nb_lines
   i_word = left(word_line(i))
   i_sense = right(word_line(i))
   Select SYNONYM from SYN_TABLE
          where ENTRY = i_word and SENSE = i_sense
   Do while (next_answer exists)
      SQL_Get j_word
      jcol = LOCATE_COLUMN(j_word)
          /* locate-create column of j_word */
      matrix(i,jcol) = 1
   end
end /*********************************************/
/* Optionally print out the                  */
/* line_labels , column_labels and           */
/* content of the final matrix               */
/*********************************************/ line_out = '**********'
Do i = 1 to nb_columns
   line_out = concatenate(line_out,left(word_column(i),8))
end
```

```
PRINT(line_out)
line_out = ''

Do i = 1 to nb_lines
   line_out = left(word_line(i),8)
   Do j = 1 to nb_columns
      line_out = concatenate(line_out,left(matrix(i,j),8))
   end
   PRINT(line_out)
end

END MAIN;

/******************************************/
/* FUNCTION to                            */
/* locate the line                        */
/* identified by a given word             */
/******************************************/

LOCATE_LINE(word: string) FUNCTION RETURNS(integer):

first_word = concatenate(word,'1')
 n = index     (f. st_word)
 if (n>0) th    TURN(n)    /* the line already exists */
 else RETURN(-1)           /* the line doesn't exist  */

END LOCATE_LINE

/******************************************/ /* FUNCTION to
*/ /* locate or create the column        */ /* identified
by a given word           */
/******************************************/

LOCATE_COLUMN(word: string) FUNCTION RETURNS(integer):

n = index_column(word)
 if (n>0) then RETURN(n)        /* the column already exists */
 else do                        /* the column doesn't exist  */
    nb_columns = nb_columns + 1 /* we create it              */
    word_column(nb_columns) = word
    index_column(word) = nb_columns
    RETURN(nb_columns)
 end

END LOCATE_COLUMN

------------------------------------------------------------
```

The environment matrix of "incroyablement 01" is represented in Table 2.

$$DB(i,i') = \frac{11_{ii'}}{11_{ii'} + 1/4(10_{ii'} + 01_{ii'})}$$

TABLE 2

| | |
|---|---|
| incroyablement01 | 11111111100000000000000000000000000000000000000000000000000 |
| epatamment01 | 00011000011111110000000000000000000000000000000000000000000 |
| extraordinairement01 | 01101110000011001111000000000000000000000000000000000000000 |
| monstrueusement01 | 00000000000000000001110000000000000000000000000000000000000 |
| monstrueusement02 | 00010000000010000000001100000000000000000000000000000000000 |
| monstrueusement03 | 01100000000100000000000000000000000000000000000000000000000 |
| effroyablement01 | 00000010000000000001110011000000000000000000000000000000000 |
| effroyablement02 | 00000000000010000000001000000000000000000000000000000000000 |
| horriblement01 | 00000000000000000001100111100000000000000000000000000000000 |
| horriblement02 | 01110111000010000000000000111000000000000000000000000000000 |
| drolement01 | 00000000000000000000000000001110000000000000000000000000000 |
| drolement02 | 00000000000000000000000000000111000000000000000000000000000 |
| excessivement01 | 00000000000000000100100100100000000000000000000000000000000 |
| excessivement02 | 00111010000100000000000000000000010000000000000000000000000 |
| excessivement03 | 00000000100000000000000000000000001111100000000000000000000 |
| extremement01 | 01011111000100001001000000000000001000011110000000000000000 |
| fabuleusement01 | 00110000001000000000000000000000000000000000000000000000000 |
| formidablement01 | 01100010100000000000000000000000000000000000000000000000000 |
| formidablement02 | 00011000000100000000000000000000000000000000000000000000000 |
| terriblement01 | 11110101100000000000000000100000001000000000011000000000000 |
| tres01 | 11100010101000000000000000001010000001000001010011111111111 |
| enormement01 | 00000001000000000000000000000000000000000010000000000000000 | where the 59 columns in the matrix correspond respectively to the following words: drôlement, excessivement, extremement, extraordinairement, fabuleusement, formidablement, terriblement, tres, enormement, admirablement, merveilleusement, prodigieusement, incroyablement, fantastiquement, chouettement, remarquablement, exceptionnellement, majestueusement, monstrueusement, horriblement, abominablement, affreusement, inimaginablement, invraisemblablement, atrocement, epouvantablement, odieusement, effroyablement, diablement, serieusement, bigrement, comiquement, cocassement, risiblement, curieusement, bizarrement, etrangement, follement, fort, outre mesure, par trop, exagerement, demesurement, infiniment, puissamment, tout @ fait, immensement, beaucoup, vachement, absolument, parfaitement, joliment, rudement, tout plein, vraiment, hautement, furieusement, fortement, en diable.

Each line of the matrix is obtained by checking which words corresponding to the various columns are synonoums of the word at the beginning of the line. For example, the words associated with columns 1-9 are synonoums for incroyablement. This may be verified by reviewing Table 1. Accordingly, the numeral 1 is entered in columns 1-9 of the matrix. None of the other words in the remaining columns of line 1 are synonoums for the word incroyablement and a 0 is entered into the remaining columns. Another example, are words associated with columns 4, 5 and 10-16 are the only synonoums for epatamment in line 2. Thus, a 1 is entered into each of these columns and a 0 is entered into the remaining columns.

As stated earlier, a similarity index is used to measure the resemblance between the profiles of all the words belonging to the C/S/D environment of an entry, and not just the synonyms.

The selected index is the "Dice Bis" index (DB) which can be defined as follows, for each pair of words (i, i') belonging to the "C/S/D" environment:

This index satisfies the above-mentioned conditions: a neutral role is assigned to the 00 configurations, a dominating role is assigned to the 1 1 configurations and a negative but weighted role is assigned to the unfavorable 0 1 and 1 0 configurations. Its values are contained in the [0,1] range as follows:

$$DB(i,i') = \begin{cases} 0 \text{ if the profiles of } i \text{ and } i' \text{ are different} \\ 0.5 \text{ if } i \text{ and } i' \text{ have } 1/6 \text{ words in common} \\ 1 \text{ if the profiles of } i \text{ and } i' \text{ are identical} \end{cases}$$

For example, if the profiles of i ' and 'i' are:

```
i  1 1 1 1 0 0 0 0 0 1 1 1 1 0
i' 1 0 1 1 1 1 0 0 0 0 1 0 0 0
``` their Dice Bis index will have the value:

$$DB(i,i') \frac{4}{4 + 1/4(4 + 2)} = 0.73$$

because: $11_{ii'}=4$, $10_{ii'}=4$, $01_{ii'}=2$.

Like most similarity indexes, its values vary between 0 and 1. The closer to 0 it is, the more different two words will be. The closer to 1 it is, the more similar two words will be. The Dice Bis index was selected because the 1/6th majority rule is particularly suitable for the distribution of the synonymic data. A stricter index would have "neglected" some relations which, however slight, must be taken into account. But at the same time, the Dice Bis index could be considered as too lax. This criticism would be justified if the index were used in a simple list matching context, in which case it could lead to spurious labeling.

The method is based on the progressive building of a cluster and allows its index to be integrated while minimizing the risks described above.

Starting from the C/S/D environment rectangular matrix, the Dice Bis index, is used to build the similarity matrix between the different words belonging to the environment (step 3). In the case of the "meaning-entry" incroyablement 01", this matrix is represented in Table 3.

Step k

The cluster contains k+1 words:

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 incroyablement01* | 1. | .36 | .78 | .00 | .27 | .50 | .24 | .00 | .00 | .77 | .00 | .00 | .00 | .70 | .24 | .69 | .50 | .76 | .50 | .82 | .49 | .31 |
| 2 epatamment01A | .36 | 1. | .46 | .00 | .47 | .29 | .00 | .31 | .00 | .35 | .00 | .00 | .00 | .57 | .00 | .41 | .50 | .00 | .67 | .18 | .12 | .00 |
| 3 extraordinairement01D | .78 | .46 | 1. | .25 | .52 | .44 | .38 | .27 | .00 | .76 | .00 | .00 | .24 | .69 | .00 | .74 | .55 | .57 | .55 | .59 | .31 | .00 |
| 4 monstrueusement01A | .00 | .00 | .25 | 1. | .00 | .00 | .80 | .00 | .62 | .00 | .00 | .00 | .44 | .00 | .00 | .21 | .00 | .00 | .00 | .00 | .00 | .00 |
| 5 monstrueusement02A | .27 | .47 | .52 | .00 | 1. | .00 | .00 | .80 | .00 | .44 | .00 | .00 | .00 | .33 | .00 | .20 | .44 | .00 | .44 | .24 | .00 | .00 |
| 6 monstrueusement03A | .50 | .29 | .44 | .00 | .00 | 1. | .00 | .00 | .00 | .47 | .00 | .00 | .62 | .62 | .00 | .38 | .80 | .73 | .50 | .44 | .28 | .00 |
| 7 effroyablement01A | .24 | .00 | .38 | .80 | .00 | .00 | 1. | .00 | .92 | .22 | .00 | .00 | .57 | .29 | .00 | .33 | .00 | .33 | .00 | .00 | .13 | .00 |
| 8 effroyablement02A | .00 | .31 | .27 | .00 | .80 | .00 | .00 | 1. | .00 | .29 | .00 | .00 | .00 | .00 | .00 | .00 | .00 | .00 | .00 | .00 | .00 | .00 |
| 9 horriblement01A | .00 | .00 | .00 | .62 | .00 | .00 | .92 | .00 | 1. | .00 | .00 | .00 | .75 | .00 | .00 | .00 | .00 | .00 | .00 | .00 | .00 | .00 |
| 10 horriblement02A | .77 | .35 | .76 | .00 | .44 | .47 | .22 | .29 | .00 | 1. | .00 | .00 | .00 | .55 | .00 | .70 | .47 | .60 | .27 | .73 | .48 | .29 |
| 11 drolement01S | .00 | .00 | .00 | .00 | .00 | .00 | .00 | .00 | .00 | .00 | 1. | .00 | .00 | .00 | .00 | .00 | .00 | .00 | .00 | .00 | .00 | .00 |
| 12 drolement02S | .00 | .00 | .00 | .00 | .00 | .00 | .00 | .00 | .00 | .00 | .00 | 1. | .00 | .00 | .00 | .00 | .00 | .00 | .00 | .25 | .00 | .00 |
| 13 excessivement01S | .00 | .00 | .24 | .44 | .00 | .62 | .57 | .00 | .75 | .00 | .00 | .00 | 1. | .00 | .00 | .00 | .00 | .00 | .00 | .00 | .00 | .00 |
| 14 excessivement02S | .70 | .57 | .69 | .00 | .33 | .62 | .29 | .00 | .00 | .55 | .00 | .00 | .00 | 1. | .00 | .71 | .80 | .57 | .80 | .59 | .35 | .00 |
| 15 excessivement03S | .24 | .00 | .00 | .00 | .00 | .00 | .00 | .00 | .00 | .00 | .00 | .00 | .00 | 1. | .18 | .00 | .33 | .00 | .21 | .13 | .00 |
| 16 extremement01S | .69 | .41 | .74 | .21 | .20 | .38 | .33 | .00 | .00 | .70 | .00 | .00 | .00 | .71 | .18 | 1. | .59 | .57 | .52 | .62 | .48 | .22 |
| 17 fabuleusement01S | .50 | .50 | .55 | .00 | .44 | .80 | .00 | .00 | .00 | .47 | .00 | .00 | .00 | .80 | .00 | .59 | 1. | .44 | .80 | .44 | .15 | .00 |
| 18 formidablement01S | .76 | .00 | .57 | .00 | .00 | .73 | .33 | .00 | .00 | .60 | .00 | .00 | .00 | .57 | .33 | .57 | .44 | 1. | .00 | .74 | .47 | .00 |
| 19 formidablement02S | .50 | .67 | .55 | .00 | .44 | .50 | .00 | .00 | .00 | .27 | .00 | .00 | .00 | .80 | .00 | .52 | .80 | .00 | 1. | .25 | .00 | .00 |
| 20 terriblement01S | .82 | .18 | .59 | .00 | .24 | .44 | .00 | .00 | .00 | .73 | .00 | .25 | .00 | .59 | .21 | .62 | .44 | .74 | .25 | 1. | .63 | .47 |
| 21 tres01S | .49 | .12 | .31 | .00 | .00 | .28 | .13 | .00 | .00 | .48 | .00 | .00 | .00 | .35 | .13 | .48 | .15 | .47 | .00 | .63 | 1. | .27 |
| 22 enormement01S | .31 | .00 | .00 | .00 | .00 | .00 | .00 | .00 | .00 | .29 | .00 | .00 | .00 | .00 | .00 | .22 | .00 | .00 | .00 | .47 | .27 | 1. |
| Mean: | .38 | .22 | .39 | .11 | .20 | .29 | .20 | .08 | .11 | .35 | .00 | .01 | .13 | .36 | .05 | .36 | .31 | .29 | .25 | .34 | .20 | .07 |
| Global mean: .21 | | | | | | | | | | | | | | | | | | | | | | |

It is to be observed that reflexivity does not appear in the binary matrix of the C/S/D environment. However, reflexivity has been restored in some configurations. This is because it is essential to take into account the symmetric relations (basic relations between two words) when computing the similarity indexes. Let us consider, for example, a pair of symmetrically related words:

a: b, c
b: a, c

If we do not take reflexivity into account, DB(a,b)=0.5 whereas if we restore it, DB(a,b)=1. Obviously, the second choice is closer to the actual data. In some cases, however, maintaining such information may prove undesirable.

1. in the case of polysemous words, the systematic restoring of reflexivity would induce positive similarity between the different meanings of a given headword. This is not acceptable as a basic assumption.
2. in the case of short and weakly linked lists, taking reflexivity into account would artificially increase the index value, which is also undesirable.

These disadvantages lead to a conditional restoring of reflexivity, in the case of symmetric configurations.

Figure 4A:
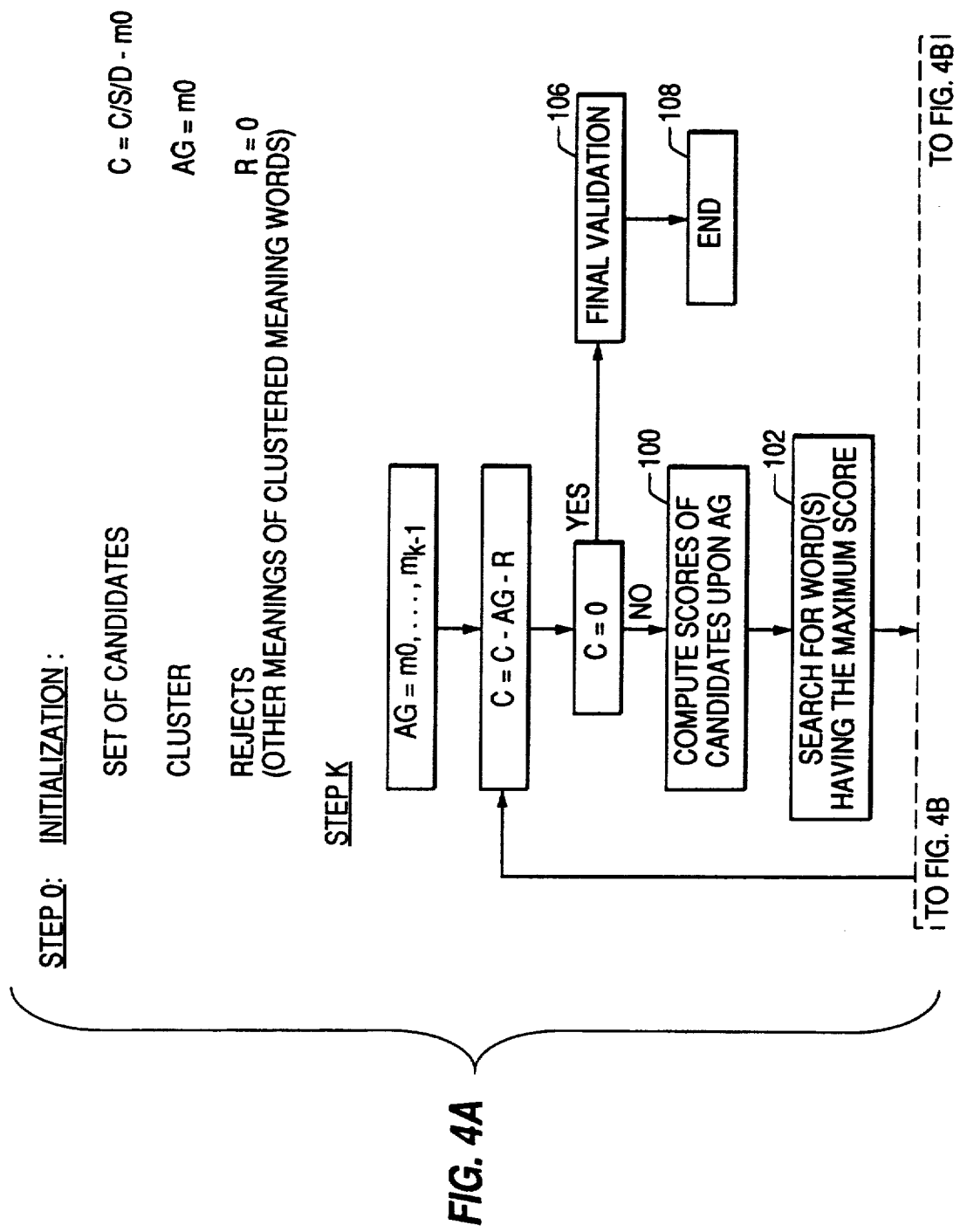
FIGS. 4A and 4B show a flow chart illustrating the incremental clustering step of FIG. 3.
Figure 4B:
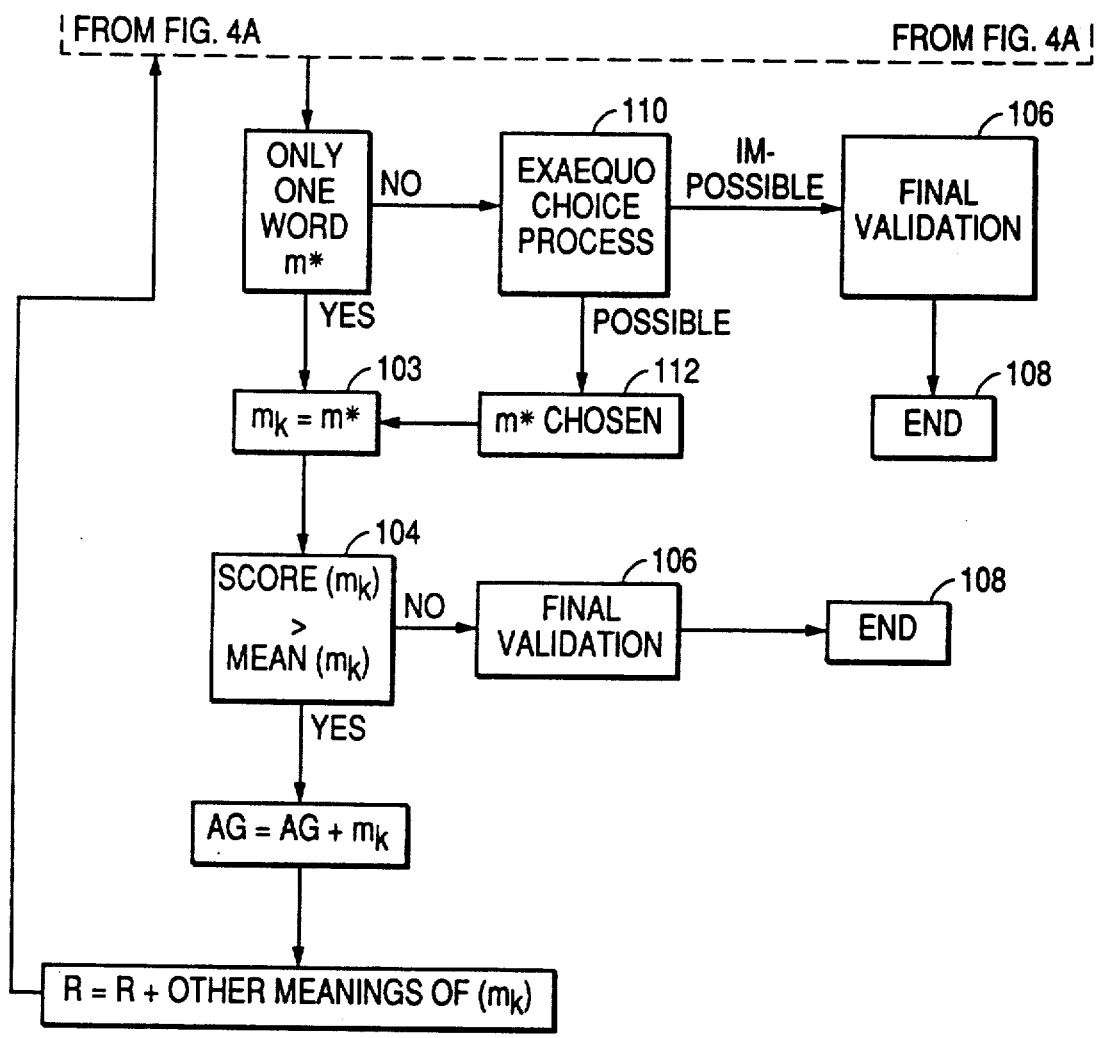

Starting from the similarity indexes, a cluster (AG) is built, step by step, for each "meaning-entry" and its C/S/D environment (step 4), as illustrated by the flow diagram on FIGS. 4A and 4B. The cluster develops according to the process described below:

Step 0

Cluster initialization:

$AG_0 = [m_0]$

Initially, the cluster only contains the pivot word $m_0$ whose synonymic relations have to be disambiguated.

$AG_k = [m_0, m_1, \ldots, m_{k-1}]$

1. An Operation 100 conducts computation of the integration scores S(i) for each word i belonging to $C/S/D - AG_k$:

$$S(i) = \frac{\sum_{i' \epsilon AG_k} DB(i,i')}{|AG_k|}$$

Where $i' \epsilon AG_k$ means each $i'$ belonging to cluster $AG_k$.

For any candidate for integration in the cluster, one computes the mean of their Dice Bis indexes on the cluster.

2. Selection of the best candidate for integration into the cluster occurs in an Operation 102: Among the words not yet integrated, a search for the word $m_{k+1}$ is initiated, such that:

$$S(m_{k+1}) = \max_{i \epsilon C/S/D - AG_k} S(i)$$

That is to say, the word that is selected in Operation 103 as a candidate for integration is the one which is closest to the cluster.

Ending Test

The score of the candidate $m_{k1}$ is compared with the means computed on the basis of the whole set of words provided by the C/S/D environment in an Operation 104.

The new cluster $AG_{k+1} = AG_k U[m_{k+1}]$ is built and the process described in step k is repeated.

Otherwise, $m_{k+1}$ is not integrated.

The process ends in an Operation 108; the cluster obtained is $AG_k$.

Final validation of the cluster in an Operation 106

Let AG be the cluster obtained at the end of the process described above and let $SV_{AG}$ be its validation threshold. Computing the mean $M_{AG}$ and the standard deviation $E_{AG}$ of the integration score distribution gives:

$$M_{AG} = \frac{\sum_{i \in AG} S(i)}{|AG|} \text{ and } E_{AG} = \sqrt{\frac{\sum_{i \in AG} (S(i) - M_{AG})^2}{|AG|}}$$

One then derives the value of $SV_{AG}=M_{AG}-E_{AG}$, which will be used as a threshold to reject the final part of the cluster. Thus, $\forall\, i \in AG$:

if $S(i) \geq SV_{AG}$, then the word i remains in the cluster.
if $S(i) < SV_{AG}$ or $S(i) < 0.5$, then i is removed from the cluster as are the words which have been integrated after i.

To this basic description of the process, it is necessary to add some conditional constraints in an Operation 110:

a) ex aequo

If at the second point of step k several words reach the same maximal score, the mean of each of these words as determined on the basis of the C/S/D environment is checked:

if they are different, the word with the highest mean is integrated in an Operation 112;
if they are identical, all the words simultaneously are integrated in the cluster in Operations 106 and 108.

b) polysemous words

As soon as a particular meaning of a polysemous word has been integrated in the cluster, the other meanings are removed and will no longer be considered as candidates.

Also, if the different meanings of a polysemous word are ex aequo (as defined under a)), the process is systematically stopped because this is indicative of a structural inconsistency in the data.

Returning to FIG. 3, final validation takes place after the cluster has been built incrementally and completes the disambiguation process (step 5). The aim of this step is to reinforce the consistency of the cluster by discarding the words that are integrated belatedly and may create some distortion of the cluster. This step is useful to overcome the problems posed by the agglomerative process ending test which may prove insufficiently stringent in that it may allow the integration at the end of the cluster of words which are not, linguistically speaking, "pertinent". The final validation threshold is the lower limit of the confidence level of the integration score distribution. Words integrated with a score lower than this limit are considered to be insufficiently linked to the cluster, even though they passed the ending test.

It was intentionally decided not to use the validation as an ending test, as otherwise it would have created clusters that would often have ben too small and therefore, difficult to use efficiently for the purpose of an operational disambiguation.

Each "meaning-entry" of the basic dictionary is subjected to this disambiguation process. Table 5 shows the result of the algorithm for the meaning entry "incroyablement 01".

TABLE 4

| Words | Nb | Status | Global Mean | Starting DB | Integration Score | Final Score |
|---|---|---|---|---|---|---|
| CLUSTERED WORDS ||||||||
| INCROY01* | 01 | Clust. | 0.377 | 1.000 | 1.000 | 0.637 |
| TERRIB01S | 20 | Clust. | 0.343 | 0.824 | 0.824 | 0.579 |
| FORMID01S | 18 | Clust. | 0.292 | 0.762 | 0.751 | 0.546 |
| HORRIB02C | 10 | Clust. | 0.351 | 0.774 | 0.700 | 0.587 |
| EXTRAO01D | 03 | Clust. | 0.385 | 0.778 | 0.674 | 0.589 |
| EXTREM01S | 16 | Clust. | 0.360 | 0.686 | 0.663 | 0.589 |
| EXCESS02S | 14 | Clust. | 0.360 | 0.696 | 0.633 | 0.614 |
| FABULE01S | 17 | Clust. | 0.309 | 0.500 | 0.543 | 0.525 |
| MONSTR03C | 06 | Clust. | 0.289 | 0.500 | 0.548 | 0.494 |
| TRES01S | 21 | Clust. | 0.204 | 0.488 | 0.403 | 0.375 |
| NON INTEGRATED WORDS ||||||||
| EPATAM01C | 02 | inval. | 0.223 | 0.364 | 0.325 | 0.325 |
| EFFROY02C | 08 | reject. | 0.079 | 0.000 |  | 0.078 |
| EFFROY01C | 07 | reject. | 0.201 | 0.235 | Stop | 0.175 |
| DROLEM02S | 12 | reject. | 0.012 | 0.000 |  | 0.023 |
| ENORME01S | 22 | reject. | 0.074 | 0.308 |  | 0.141 |
| MONSTR02C | 05 | Polys. | 0.198 | 0.267 |  | 0.265 |
| MONSTR01C | 04 | Polys. | 0.110 | 0.000 |  | 0.042 |
| EXCESS03S | 15 | Polys. | 0.052 | 0.235 |  | 0.099 |
| EXCESS01S | 13 | Polys. | 0.125 | 0.000 |  | 0.077 |
| HORRIB01C | 09 | Polys. | 0.109 | 0.000 |  | 0.000 |
| FORMID02S | 19 | Polys. | 0.252 | 0.500 |  | 0.441 |
| DROLEM01S | 11 | reject. | 0.000 | 0.000 |  | 0.000 |

TABLE 5

DISAMBIGUATED LIST

INCROYABLEMENT01*:drolement00S, enorment00S, EXCESSIVEMENT02S, EXTREMEMENT01S, EXTRAAORDINAIREMENT01D, FABULEUSEMENT01S, FORMIDABLEMENT01S, TERRIBLEMENT01S, TRES01S Percentage of disambiguated links: 77.78
Percentage of non disambiguated links: 22.22

Returning to Table 4, the cluster consists of 10 meaning words. These are listed in decreasing order of integration.

Next come the words that have not been integrated in the cluster. The "Status" column lists the words rejected an the grounds of polysemy (see point b)), the words which have not been integrated (reject.) and the words whose scores are lower than the validation threshold (inval.).

It is the word "effroyablement01C" that triggered the end of the process. At the 10th step of the process, among the words to be integrated, "effroyablement01C" had the highest score, 0.175. This value is lower than its global mean 0.201 on the C/S/D environment. Thus, the process ends after 10 iterations.

The word "epatamment01C was rejected during the final validation of the cluster. Actually, $SV_{AG}=0.460$ whereas $S(\text{'EPATAM01C'})=0.325$.

During the last stage of labeling of the senses, only those words in the cluster that are synonyms of the "meaning-word" (words with suffixes S or D) were taken into account. It should be noted that two synonyms of "incroyablement 01" were not integrated in the cluster: "enormement" and "drôlement" (2 of the 9 synonyms to be disambiguated, i.e. 22.2%). The other 7 synonyms (77.78%) have been integrated in the cluster and their relations with the pivot word are thus disambiguated. Referring again to the data, it will be seen why the links of "enormement" and "drôlement" with "incroyablement 01" could not be disambiguated.

Now, using again the SQL language, the synonymic links of "incroyablement 01", which have been disambiguated, are stored into the data-base.

EXAMPLE

To replace "00" by "02" in column SSN of the second line of SYN table:
"Update SYN set Synonym__sense__number=02 where Entry__word='incroyablement' and entry__sense__number__01 and synonym__word='exclusivement' ".

In addition to labeling the senses, such a disambiguation method allows inconsistencies in the basic dictionary to be brought to light.

While the invention has been described with reference to words of the French language, it will be understood by those skilled in the art that this invention can be applied to languages other than French without departing from the spirit and the scope of the invention as claimed herein.

We claim:

1. A method for automatically disambiguating the synonymic links in a dictionary for a natural language processing system, wherein said dictionary is stored in the memory of a data processing system and includes a list of "meaning-entries" with their respective synonym lists, characterized in that it comprises the following steps:
   reading from said dictionary a "meaning-entry", the words from which it is a synonym and its own synonyms, to build a synonymic environment table;
   digitizing said environment table to build an environment matrix;
   building a similarity matrix by computation of similarity indexes between the elements of said environment matrix;
   incrementally clustering the words having the greatest similarity index, first with said "meaning-entry" and thereafter with the previous clusters; and
   writing the "meaning-entry" and the obtained cluster containing the disambiguated synonyms back into said dictionary.

2. A method according to claim 1, characterized in that said environment matrix is obtained by associating said "meaning-entry" and the entries in its synonymic environment with the set of words contained in the synonym lists of all of these words and assigning a "1" value, when a synonymic relationship exists and a "0" value when a synonymic relationship does not exist.

3. A method according to claim 2, characterized in that said similarity indexes are computed by comparison of word profiles obtained by replacement of the words in the synonym lists of each entry by "1" or "0", according to the presence or absence, respectively, of said word in said lists.

4. A method according to claim 3, characterized in that said similarity index is defined as follows:

$$DB(i,i') = \frac{11_{ii'}}{11_{ii'} + 1/4(10_{ii'} + 01_{ii'})}$$

for each pair of words belonging to the synonymic environment.

5. A method according to claim 4, characterized in that in said incremental clustering step, it is computed, for each candidate for integration in the cluster, a score corresponding to the mean of their similarity indexes on the cluster.

6. A method according to claim 5, characterized in that it further comprises the step of comprising the score of a candidate for integration in the cluster with the mean computed on the basis of the whole set of words provided by the synonymic environment, to determine whether or not it has to be iterated in the cluster.

7. A method according to claim 6, characterized in that it further comprises the step validating the cluster by comparison of the score or each word of the cluster with a validation threshold.

8. Data processing system comprising a first memory, a second memory, an electronic dictionary including a list of "meaning entries" with their respective synonym lists stored in said second memory:
   means for reading from said dictionary stored in said second memory, a "meaning-entry", the words from which it is a synonym and its own synonyms, to build a synonymic environment table into said first memory;
   means for digitizing said environment table to build an environment matrix;
   means for computing similarity indexes between the elements of said environment matrix to build a similarity matrix;
   means for incrementally clustering the words having the greatest similarity index; and
   means for writing back into said dictionary stored in said second memory and "meaning-entry" and the words of the cluster, whereby the synonymic links in the dictionary are disambiguated.

9. System according to claim 8 characterized in that said dictionary is stored in a relational data base maintained on a Direct Access Storage Device (DASD).

* * * * *